(12) United States Patent
Topping

(10) Patent No.: US 7,810,606 B2
(45) Date of Patent: Oct. 12, 2010

(54) ELECTRIC POWER STEERING SYSTEMS FOR VEHICLES WITH ADJUSTABLE TORSION BARS AND METHODS OF RETROFITTING ELECTRIC POWER STEERING SYSTEMS FOR VEHICLES

(75) Inventor: Richard W. Topping, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 247 days.

(21) Appl. No.: 12/045,955

(22) Filed: Mar. 11, 2008

(65) Prior Publication Data

US 2009/0229909 A1    Sep. 17, 2009

(51) Int. Cl.
    *B62D 5/02* (2006.01)
(52) U.S. Cl. ..................................... 180/444
(58) Field of Classification Search .......... 180/444, 180/446
    See application file for complete search history.

(56) References Cited

U.S. PATENT DOCUMENTS 4,481,866 A * 11/1984 Matouka ............... 91/375 A
2010/0059307 A1 * 3/2010 Ryu ....................... 180/421

FOREIGN PATENT DOCUMENTS

KR    1999-0011100 B1 * 11/1999

* cited by examiner

*Primary Examiner*—Kevin Hurley
(74) *Attorney, Agent, or Firm*—Ingrassia Fisher & Lorenz, P.C.

(57) ABSTRACT

An electric power steering system for a vehicle includes a torsion bar, a controller, and an electric motor. The controller is coupled to the torsion bar, and is configured to at least facilitate adjusting the stiffness of the torsion bar based at least in part on a parameter pertaining to operation of the vehicle and generating a steering assist signal based at least in part on a deflection or a strain of the torsion bar or a torque carried by the torsion bar. The electric motor is coupled to the controller, and is configured to receive the steering assist signal therefrom and to at least facilitate implementing the steering assist signal.

17 Claims, 3 Drawing Sheets

ELECTRIC POWER STEERING SYSTEMS FOR VEHICLES WITH ADJUSTABLE TORSION BARS AND METHODS OF RETROFITTING ELECTRIC POWER STEERING SYSTEMS FOR VEHICLES

TECHNICAL FIELD

The present invention generally relates to vehicles, and more particularly relates to electric power steering systems for vehicles with adjustable torsion bars and methods for retrofitting electric power steering systems for vehicles.

BACKGROUND

Vehicle electric power steering systems generally utilize an electric motor to provide assist or active motion of the front road wheels to reduce steering wheel effort for drivers of the vehicles. Certain electric power steering systems, commonly referred to as speed sensitive electric power steering systems, modulate the amount of steering assist based on a speed of the vehicle. As the speed of the vehicle increases, a speed sensitive electric power steering system typically reduces the current of the electric motor to thereby reduce the steering assist in response to the increased vehicle speed. However, as steering loads increase, this may result in reduced precision for the electric power steering system, for example as a result of increased deflections of a torsion bar of the electric power steering system.

Accordingly, it is desirable to provide an improved electric power steering system, for example that provides increased precision, such as when steering loads are increased. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment of the present invention, an electric power steering system for a vehicle is provided. The electric power steering system comprises a torsion bar, a controller, and an electric motor. The controller is coupled to the torsion bar, and is configured to at least facilitate adjusting a stiffness of the torsion bar and generating a steering assist signal based at least in part on a deflection or a strain of the torsion bar or a torque carried by the torsion bar. The electric motor is coupled to the controller, and is configured to receive the steering assist signal therefrom and to at least facilitate implementing the steering assist signal.

In accordance with another exemplary embodiment of the present invention, a method of retrofitting an electric power steering system for a vehicle, the electric power steering system comprising a torsion bar, a controller configured to generate a steering assist signal based at least in part on a deflection or a strain of the torsion bar or a torque carried by the torsion bar, and an electric motor coupled to the controller and configured to receive the steering assist signal therefrom and to at least facilitate implementing the steering assist signal, is provided. The method comprises the steps of obtaining the electric power steering system and reconfiguring the controller so as to be further configured to at least facilitate adjusting a stiffness of the torsion bar based at least in part on a parameter pertaining to operation of the vehicle.

In accordance with a further exemplary embodiment of the present invention, an electric power steering system for a vehicle having a steering wheel and a plurality of road wheels is provided. The electric power steering system comprises a steering column, a torsion bar, a pinion shaft, a rack, a control pinion, a detection unit, a controller, a torsion bar adjuster, and an electric motor. The steering column is configured to be coupled to the steering wheel and to be rotationally movable thereby. The torsion bar is coupled to the steering column, and is configured to receive a torque therefrom during rotational movement of the steering column. The pinion shaft is coupled between the torsion bar and the plurality of road wheels, and is configured to rotationally move based at least in part on the torque carried by the torsion bar. The rack is coupled between the pinion shaft and the plurality of road wheels, and is configured to move, and thereby at least facilitate changing a position of the plurality of road wheels, based at least in part on rotational movement of the pinion shaft. The control pinion is coupled between the pinion shaft and the rack, and is configured to at least facilitate movement of the rack. The detection unit is coupled to the torsion bar, and is configured to detect a deflection or a strain of the torsion bar or a torque carried by the torsion bar and to generate a deflection, strain, or torque signal pertaining thereto. The controller is coupled to the detection unit, and is configured to at least facilitate receiving the deflection, strain, or torque signal from the detection unit, generating a torsion bar adjustment signal based at least in part on a parameter pertaining to operation of the vehicle, and generating a steering assist signal based at least in part on the deflection, strain, or torque signal. The torsion bar adjuster is coupled between the controller and the torsion bar, and is configured to adjust the stiffness of the torsion bar in accordance with the torsion bar adjustment signal. The electric motor is coupled to the controller, and is configured to receive the steering assist signal therefrom and to at least facilitate implementing the steering assist signal.

BRIEF DESCRIPTION OF THE DRAWINGS

The present invention will hereinafter be described in conjunction with the following drawing figures, wherein like numerals denote like elements, and.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
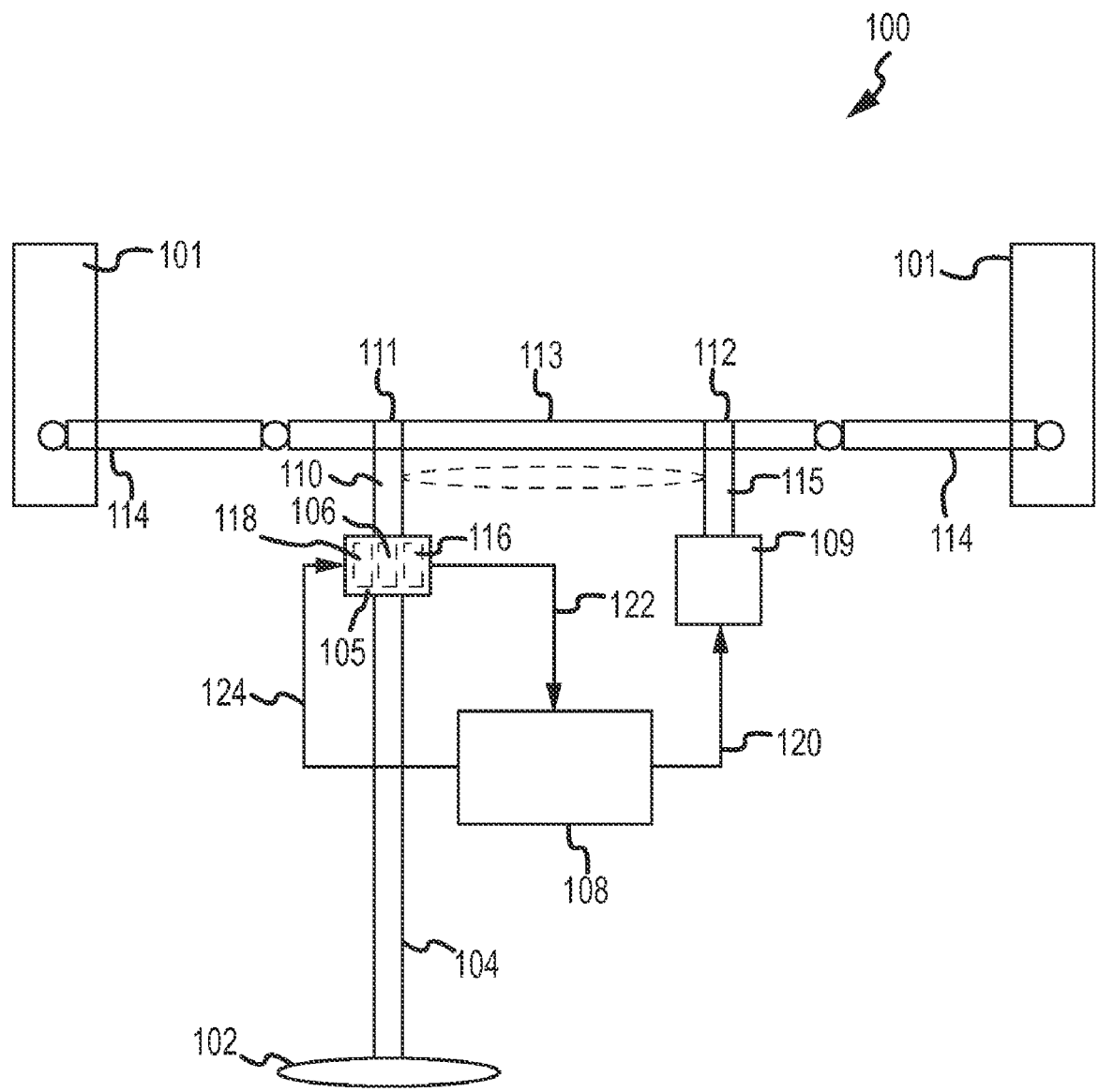
FIG. 1 is a schematic drawing of an electric power steering system for a vehicle that has a steering column, a torsion bar, a detection unit, a controller, a torsion bar adjuster, and an electric motor, accordance with an exemplary embodiment of the present invention.

FIG. 1 is a schematic drawing of an electric power steering system 100 for a vehicle having road wheels 101 and a steering wheel 102, in accordance with an exemplary embodiment of the present invention. The electric power steering system 100 includes a steering column 104, a torsion bar 106, a controller 108, and an electric motor 109. In the depicted embodiment, the electric power steering system 100 also includes a pinion shaft 110, a control pinion 111, an assist pinion 112, a rack 113, tie rods 114, a motor shaft 115, a detection unit 116, and a torsion bar adjuster 118.

The steering column 104 is coupled to the steering wheel 102, and is rotationally movable thereby. The steering column 104 is configured to at least facilitate movement of the road wheels 101 based at least in part on movement of the steering wheel 102.

The torsion bar 106 is coupled to the steering column 104, and is configured to receive a torque therefrom during rotational movement of the steering column 104. In conjunction with the torsion bar adjuster 118 and controller 108, the torsion bar 106 is an active torsion bar whose stiffness is adjustable by means of the controller 108, for example based on vehicle speed, vehicle acceleration, steering wheel displacement, steering load, and/or other parameters or conditions. As depicted in FIG. 1, the torsion bar 106, the detection unit 116, and the torsion bar adjuster 118 are housed together in a common housing 105. However, this may vary in other embodiments.

The pinion shaft 110 is coupled between the torsion bar 106 and the plurality of road wheels 101, and is configured to rotationally move based at least in part on the torque. Specifically, in the depicted embodiment, the pinion shaft 110 is coupled between the torsion bar 106 and the control pinion 111. The pinion shaft 110 is configured to rotationally move based at least in part on the above-referenced torque, and to thereby ultimately influence the position of the road wheels 101 via the control pinion 111, the rack 113, and the tie rods 114. Specifically, in a preferred embodiment, the pinion shaft 110 receives torque from the torsion bar 106 resulting from the above-referenced torque provided to the torsion bar 106 via the steering column 104, and rotationally moves in response thereto. The rotational movement of the pinion shaft 110 in turn manipulates the control pinion 111, which in turn causes movement of the rack 113 coupled thereto, which in turn causes movement of the tie rods 114 coupled thereto, and which ultimately influences the position of the road wheels 101 coupled thereto.

The rack 113 is coupled between the pinion shaft 110 and the plurality of road wheels 101, and is configured to move, and thereby at least facilitate changing a position of the plurality of road wheels 101, based at least in part on rotational movement of the pinion shaft 110. The control pinion 111 is coupled between the pinion shaft 110 and the rack 113, and is configured to at least facilitate movement of the rack 113 based at least in part on movement of the pinion shaft 110. The tie rods 114 are coupled between the rack 113 and the road wheels 101, and are configured to at least facilitate movement of the road wheels 101 based at least in part on movement of the rack 113.

The controller 108 is coupled to the electric motor 109, and is also coupled directly or indirectly to the torsion bar 106. The controller 108 is configured to at least facilitate adjusting the torsion bar 106 based at least in part on a parameter pertaining to operation of the vehicle. In an exemplary embodiment, the controller 108 adjusts the stiffness of the torsion bar 106. The controller 108 is further configured to generate a steering assist signal 120 based at least in part on a deflection or strain of the torsion bar 106 or a torque carried by the torsion bar 106, and to transmit the steering assist signal 120 to the electric motor 109.

In a preferred embodiment, the controller 108 is further coupled to the detection unit 116 and to the torsion bar adjuster 118. The controller 108 is configured to receive a deflection, strain, or torque signal 122 from the detection unit 116. The controller 108 is further configured to generate the steering assist signal 120 based at least in part on the deflection, strain, or torque signal 122. For example, when an increase in steering load for the electric power steering system 100 occurs, the controller 108 provides instructions to adjust the steering assist signal 120 to reduce steering effort and improve steering precision and the driving experience for a driver of the vehicle, in a preferred embodiment of the present invention.

Also in a preferred embodiment, the controller 108 generates the steering assist signal 120 based not only on the deflection, strain, or torque signal 122, but also based on one or more additional parameters pertaining to operation of the vehicle. For example, in one such embodiment, the controller 108 generates the steering assist signal 120 based upon the deflection, strain, or torque signal 122 and also based upon values of a vehicle speed, a vehicle acceleration, and/or a displacement of the steering wheel 102, which the controller 108 may receive from one or more non-depicted sensors and/or other sources. This allows for further improved steering effort and precision, for example as vehicle speed, vehicle acceleration, and/or steering wheel displacement increases and/or steering loads increase.

The controller 108 may receive such values of vehicle speed, vehicle acceleration, and/or steering wheel 102 displacement as one or more signals from one or more non-depicted signals, transmitters, and/or other sources in one preferred embodiment. However, this may vary in other embodiments. Also, as referenced herein, vehicle speed and vehicle acceleration can refer to any number of different types of speed and acceleration measured on or with respect to and/or otherwise used in connection with the vehicle. Additionally, other parameters may also be used, among other possible variations in different embodiments of the present invention.

The controller 108 transmits the steering assist signal 120 to the electric motor 109 for implementation. In the depicted embodiment, the steering assist signal 120 includes instructions for the electric motor 109 as to a desired electric current to reduce steering effort for the driver of the vehicle, for example that results in a desired manipulation of the assist pinion 112, in order to ultimately influence steering effort at the steering wheel 102 and positioning of the road wheels 101 in a desired manner. Similarly, the steering assist signal 120 may include instructions as to a desired electric current that results, directly or indirectly, in a desired manipulation of the control pinion 111, and/or one or more other types of instructions to ultimately influence positioning of the road wheels 101 in a desired manner.

Also in a preferred embodiment, the controller 108 at least facilitates the adjustment of the stiffness of the torsion bar 106 via a torsion bar adjustment signal 124 that is transmitted to the torsion bar adjuster depicted in FIG. 2 and described below in connection therewith, that adjusts the stiffness of the torsion bar 106 based on the torsion bar adjustment signal 124. In such an embodiment, the torsion bar adjustment signal 124 includes instructions as to a desired adjustment for the torsion bar 106. The torsion bar adjustment signal 124 may also be transmitted to another, non-depicted unit or device which performs the same function. In the depicted embodiment, the deflection, strain, or torque signal 122 travels from the detection unit 116 in the direction of the arrow representing the deflection, strain, or torque signal 122 in FIG. 1 toward the controller 108.

In a preferred embodiment, the controller 108 generates the torsion bar adjustment signal 124 based on one or more parameters pertaining to operation of the vehicle. For example, in one such embodiment the controller 108 generates the torsion bar adjustment signal 124 based upon values of vehicle speed, vehicle acceleration, and/or steering wheel 102 displacement which, as referenced above, the controller 108 may receive from one or more non-depicted sensors and/or other sources. Other parameters may also be used. The controller 108 transmits the torsion bar adjustment signal 124 to the torsion bar adjuster 118. It will be appreciated that the parameters used in connection with the steering assist signal 120 may differ from those used in connection with the torsion bar adjustment signal 124.

The electric motor 109 is coupled to the controller 108, and is configured to receive the steering assist signal 120 therefrom and to at least facilitate implementation of the steering assist signal 120. In one preferred embodiment depicted in FIG. 1, the electric motor 109 is coupled to the rack 113. For example, the electric motor 109 may be coupled to the rack 113 via the assist pinion 112 via the above-referenced motor shaft 115, and may implement the steering assist signal 120 thereby. Specifically, the electric motor 109 produces an electric current resulting from an external voltage source, such as a battery, not depicted. The current causes rotational movement of the motor shaft 115 that results in a manipulation of the assist pinion 112 in a desired manner. The current is based on instructions received via the steering assist signal 120. The manipulation of the assist pinion 112 in turn causes reduction in steering effort required of the driver in a desired manner. The electric motor 109 may also be otherwise coupled to the rack 113 via one or more other techniques to cause reduction in steering effort required of the driver in a desired manner.

In a preferred embodiment, the amount of electric current of the electric motor 109 varies based on the instructions provided in the steering assist signal 120, which in turn is dependent upon the desired amount of steering assist as determined by the controller 108. The amount of electric current of the electric motor 109 in turn affects the amount of torque carried by the motor shaft 115 and, accordingly, affects the amount of steering assist provided in accordance with the steering assist signal 120 instructions.

In an alternate preferred embodiment, the electric motor 109 is coupled, either directly or indirectly, to the steering column 104. In this embodiment, the torsion bar 106, torsion bar adjuster 118, and detection unit 116 are repositioned between the electric motor 109 and the steering wheel 102. As in the embodiment shown in FIG. 1, the torque from the electric motor 109 provides steering assist in accordance with the steering assist signal 120 instructions. But, in this embodiment, the assist torque is applied to the steering column 104 rather than the rack 113.

The detection unit 116 is coupled between the torsion bar 106 and the controller 108. The detection unit 116 is configured to detect deflection or strain of the torsion bar 106 or torque carried by the torsion bar 106, to generate the above-referenced deflection, strain, or torque signal 122 pertaining thereto, and transmit the deflection, strain, or torque signal 122 to the controller 108. The detection unit 116 may be housed with the torsion bar, as depicted in FIG. 2, in certain embodiments. However, in other embodiments this may vary. As will be described below in connection with FIG. 2, in certain preferred embodiments the detection unit 116 may include one or more of the following: a displacement transducer, a strain transducer, and/or a torque transducer. A more detailed drawing of an exemplary embodiment of the detection unit 116 is provided in FIG. 2 and will be described below in connection therewith.

The torsion bar adjuster 118 is coupled between the controller 108 and the torsion bar 106. The torsion bar adjuster 118 is configured to adjust the stiffness of the torsion bar 106 in accordance with the torsion bar adjustment signal 124. In one preferred embodiment, the torsion bar adjustment unit 188 comprises two or more non-depicted disks at each end of the torsion bar 106 that adjust stiffness in the torsion bar 106 through torque between them caused by an electric current. However, this may vary in other embodiments. For example, in various other embodiments, the torsion bar adjustment unit 188 may comprise one or more electromagnetic, electromechanical, hydromechanical, and/or other types of devices that serves as a stiffening mechanism that works across the length of the torsion bar 106. Also, in certain embodiments the torsion bar adjustment unit 118 and/or the detection unit 116 may be part of the same unit, and/or may be part of the controller 108.

It will be appreciated that in certain embodiments, one or more of the depicted components of the electric power steering system 100 may not be necessary. For example, in the alternate embodiments described directly above, the assist pinion 112 is unnecessary because the electric motor 109 provides the desired steering assist instead via the steering column 104 and the control pinion 111. It will similarly be appreciated that while the electric power steering system 100 is shown as implemented in connection with a rack and pinion steering system, in other embodiments the electric power steering system 100 may instead by implemented in connection with a recirculating ball steering system and/or another type of system.

Figure 2:
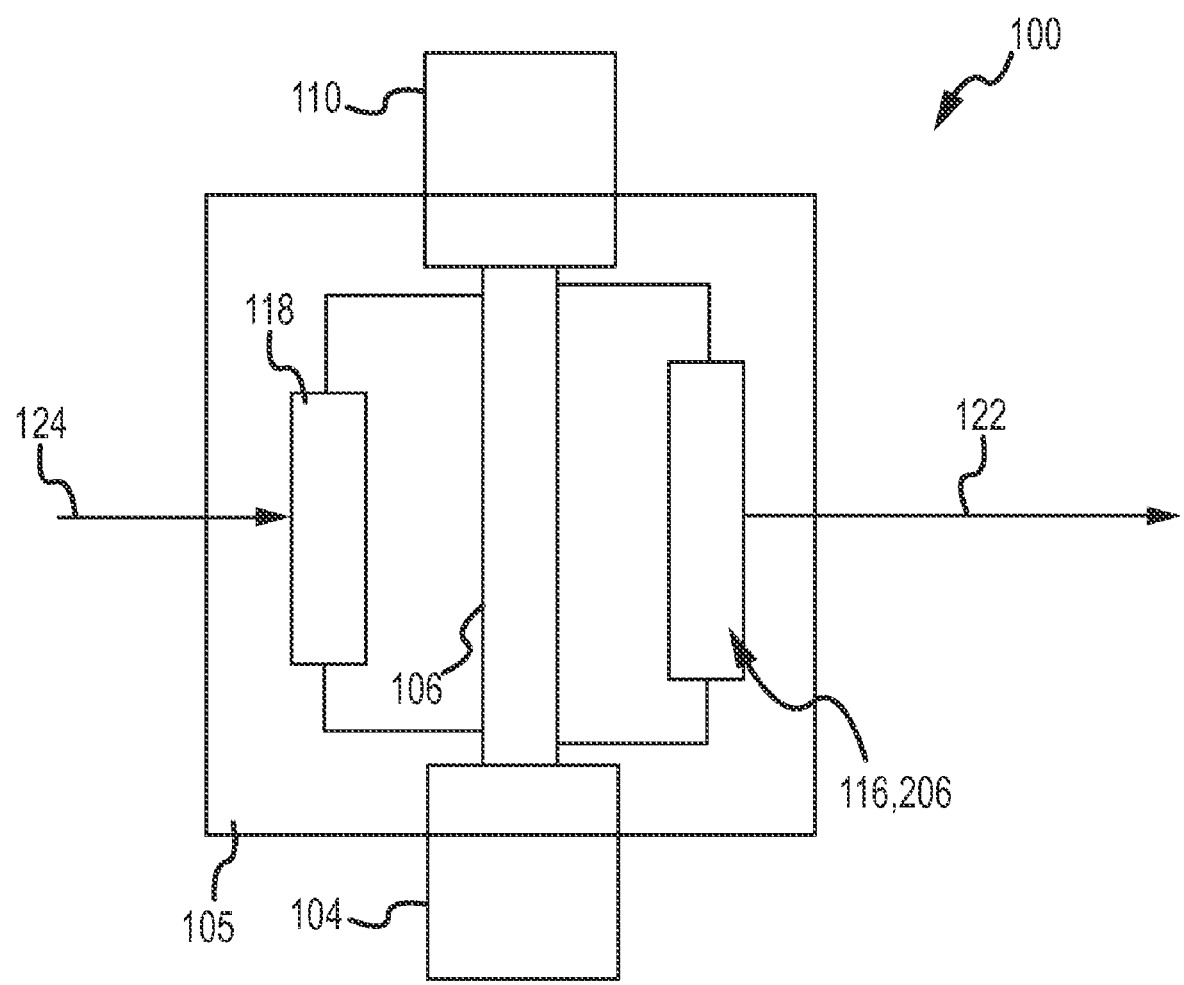
FIG. 2 is a schematic drawing of a portion of the electric power steering system of FIG. 1, depicting the torsion bar, the detection unit, and the torsion bar adjuster thereof, in accordance with an exemplary embodiment of the present invention.

FIG. 2 is a schematic drawing of a portion of the electric power steering system 100 of FIG. 1, depicting the steering column 104 and the torsion bar 106 along with the pinion shaft 110, the detection unit 116, and the torsion bar adjuster 118, in accordance with an exemplary embodiment of the present invention. In the depicted embodiment, the detection unit 116 comprises a transducer 206. The transducer 206 is configured to generate the above-referenced deflection, strain, or torque signal 122 based on the relative motion detected by the transducer 206. However, this may vary in other embodiments.

In one preferred embodiment, the transducer 206 comprises a strain transducer configured to detect a strain in the torsion bar 106. In another preferred embodiment, the transducer 206 comprises a displacement transducer configured to detect the torsional deflection of the torsion bar 106. In another preferred embodiment, the transducer 206 comprises a torque transducer configured to detect torque carried by the torsion bar 106. In yet other embodiments, multiple transducers 206 of either the same type or different types may be used. As described in greater detail above, the deflection, strain, or torque signal 122 influences the steering assist of the vehicle, for example by influencing the steering assist signal 120 described above in connection with FIG. 1.

The torsion bar adjuster 118 is coupled between the controller 108 of FIG. 1 (not depicted in FIG. 2) and the torsion bar 106. The torsion bar adjuster 118 is configured to receive the torsion bar adjustment signal 124 and to adjust the stiffness of the torsion bar 106 in accordance therewith. As mentioned above, in one preferred embodiment, the torsion bar adjustment unit 188 comprises two or more non-depicted disks at each end of the torsion bar 106 that adjust stiffness in the torsion bar 106 through torque between them caused by an electric current. However, this may vary in other embodiments. For example, in various other embodiments, the torsion bar adjustment unit 188 may comprise one or more electromagnetic, electromechanical, hydromechanical, and/or other types of devices. In yet other embodiments, the torsion bar adjuster 118 may be part of the controller 108 of FIG. 1.

Figure 3:
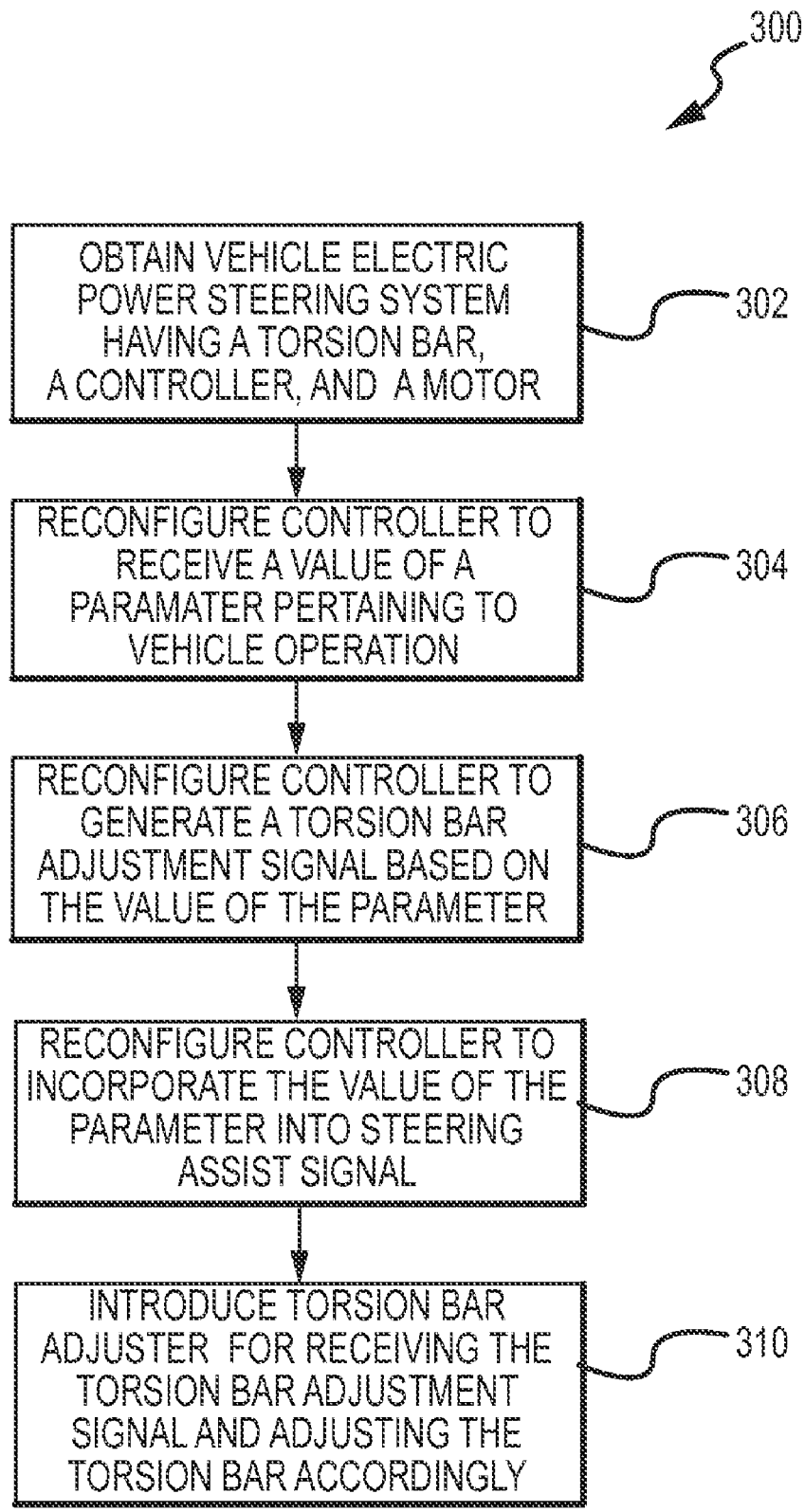
FIG. 3 is a flowchart of a method for retrofitting an electric power steering system of a vehicle to include an active torsion bar, such as in the electric power steering system of FIG. 1, in accordance with an exemplary embodiment of the present invention.

FIG. 3 is a flowchart of a process 300 for retrofitting an electric power steering system of a vehicle to include an active torsion bar, such as in the electric power steering system 100 of FIG. 1, in accordance with an exemplary embodiment of the present invention. As depicted in FIG. 3, the process 300 begins with the step of obtaining an electric power steering system for a vehicle (step 302). The electric power steering system obtained in step 302 is preferably a typical electric power steering system having a non-adjustable torsion bar, a controller configured to detect deflection or strain of the torsion bar or a torque carried by the torsion bar and to generate a steering assist signal based at least in part on the deflection or strain of the torsion bar or a torque carried by the torsion bar, and an electric motor coupled to the controller and configured to receive the steering assist signal therefrom and to at least facilitate implementing the steering assist signal.

In addition, in one preferred embodiment, the controller is further reconfigured to receive a value of one or more parameters pertaining to one or more vehicle states (step 304). For example, in one preferred embodiment, the parameters include a velocity, an acceleration of the vehicle, and/or a displacement of the steering wheel of the vehicle. Other parameters may also be used. Step 304 may not be necessary in certain embodiments, for example in which the controller is already configured to receive values of the desired parameters.

The controller of the electric power steering system obtained in step 302 is reconfigured to at least facilitate adjustment of the stiffness of the torsion bar based at least in part on the value of the one or more parameters (step 306). In a preferred embodiment, the controller is reconfigured in step 306 to generate a torsion bar adjustment signal based on the value of the one or more parameters obtained in step 304. In other embodiments, the controller may be reconfigured in step 306 to directly adjust the stiffness of the torsion bar, based at least in part on the value of the one or more parameters obtained in step 304.

Also in a preferred embodiment, the controller is also reconfigured to incorporate values of one or more parameters into the steering assist signal (step 308). For example, in one such preferred embodiment, the controller may be reconfigured to generate the steering assist signal based not only the torsion bar deflection, strain, or torque, but also on values of vehicle speed, vehicle acceleration, steering wheel displacement, and/or one or more other parameters. It will be appreciated that the parameters used in connection with the steering assist signal may differ from those used in connection with the torsion bar adjustment signal. It will also be appreciated that in certain embodiments step 308 may not be necessary, for example in which the steering assist signal is determined solely based on the torsion bar deflection, strain, or torque or in which the controller is already configured to receive values of the desired parameters.

In addition, a torsion bar adjuster is introduced to the electric power steering system (step 310). The torsion bar adjuster is coupled between the controller and the torsion bar, and is configured to receive the torsion bar adjustment signal from the controller and adjust the torsion bar in accordance therewith. In one preferred embodiment, the torsion bar adjuster may be integrated as part of a steering column of the electric power steering system, such as that depicted in FIG. 2 and described above in connection therewith. However, this may vary in other embodiments. For example, in certain alternate embodiments, the torsion bar adjuster is introduced as part of the controller, or an existing component of the electric power steering system can be reconfigured to perform the functions of the torsion bar adjuster.

It will be appreciated that certain steps of the process 300 depicted in FIG. 3 may not be necessary in certain embodiments, and/or that certain steps of the process 300 may be combined into a single step. It will similarly be appreciated that certain steps of the process 300 may be performed simultaneously or in a different order than that depicted in FIG. 3 and/or described above in connection therewith.

Accordingly, an improved electric power steering system is provided with an active torsion bar and improved steering assist functionality. The improved electric power steering system allows for improved precision and/or an improved driving experience for the vehicle. In addition, a method is provided for retrofitting an electric power steering system to include an active torsion bar, and to thereby allow for improved precision and/or an improved driving experience for the vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An electric power steering system for a vehicle, the electric power steering system comprising:
   a torsion bar;
   a detection unit coupled to the torsion bar and configured to detect a deflection or strain of the torsion bar or a torque carried by the torsion bar and provide an indication thereof;
   a controller coupled to the detection unit and configured to at least facilitate:
      generating a torsion bar adjustment signal; and
      generating a steering assist signal based at least in part on the indication;
   a torsion bar adjuster coupled between the controller and the torsion bar and configured to adjust a stiffness of the torsion bar in accordance with the torsion bar adjustment signal; and
   an electric motor coupled to the controller and configured to receive the steering assist signal therefrom and to at least facilitate implementing the steering assist signal.

2. The electric power steering system of claim 1, wherein the detection unit comprises a transducer.

3. The electric power steering system of claim 2, wherein the transducer comprises a displacement transducer.

4. The electric power steering system of claim 2, wherein the transducer comprises a strain transducer.

5. The electric power steering system of claim 2, wherein the transducer comprises a torque transducer.

6. The electric power steering system of claim 1, wherein the vehicle includes a steering wheel and a plurality of road wheels, and the electric power steering system further comprises:
- a steering column coupled between the steering wheel and the torsion bar, the steering column configured to introduce the torque to the torsion bar during movement of the steering wheel;
- a pinion shaft coupled between the torsion bar and the plurality of road wheels and configured to rotationally move based at least in part on the torque; and
- a rack coupled between the pinion shaft and the plurality of road wheels and configured to move, and thereby at least facilitate changing a position of the plurality of road wheels, based at least in part on rotational movement of the pinion shaft.

7. The electric power steering system of claim 6, wherein an electric current of the electric motor causes movement of the steering column.

8. The electric power steering system of claim 6, wherein an electric current of the electric motor causes movement of the rack.

9. The electric power steering system of claim 1, wherein the controller is further configured to generate the steering assist signal or the torsion bar adjustment signal based at least in part on a value of a parameter pertaining to operation of the vehicle.

10. The electric power steering system of claim 9, wherein the vehicle includes a steering wheel and the parameter comprises a speed or an acceleration of the vehicle or a displacement of the steering wheel.

11. An electric power steering system for a vehicle having a steering wheel and a plurality of road wheels, the electric power steering system comprising:
- a steering column configured to be coupled to the steering wheel and to be rotationally movable thereby;
- a torsion bar coupled to the steering column and configured to receive a torque therefrom during rotational movement of the steering column; and
- a pinion shaft coupled between the torsion bar and the plurality of road wheels and configured to rotationally move based at least in part on the torque;
- a rack coupled between the pinion shaft and the plurality of road wheels and configured to move, and thereby at least facilitate changing a position of the plurality of road wheels, based at least in part on rotational movement of the pinion shaft;
- a control pinion coupled between the pinion shaft and the rack and configured to at least facilitate movement of the rack;
- a detection unit coupled to the torsion bar and configured to detect a deflection or a strain of the torsion bar or the torque carried by the torsion bar and to generate a deflection, strain, or torque signal pertaining thereto;
- a controller coupled to the detection unit and configured to at least facilitate:
    - receiving the deflection, strain, or torque signal from the detection unit;
    - generating a torsion bar adjustment signal based at least in part on a parameter pertaining to operation of the vehicle; and
    - generating a steering assist signal based at least in part on the deflection, strain, or torque signal;
- a torsion bar adjuster coupled between the controller and the torsion bar and configured to adjust a stiffness of the torsion bar in accordance with the torsion bar adjustment signal; and
- an electric motor coupled to the controller and configured to receive the steering assist signal therefrom and to at least facilitate implementing the steering assist signal.

12. The electric power steering system of claim 11, wherein the detection unit comprises a transducer.

13. The electric power steering system of claim 11, wherein the transducer comprises a displacement transducer, a strain transducer, or a torque transducer.

14. The electric power steering system of claim 11, wherein an electric current of the electric motor causes movement of the steering column.

15. The electric power steering system of claim 11, wherein an electric current of the electric motor causes movement of the rack.

16. The electric power steering system of claim 11, wherein the parameter comprises a speed or an acceleration of the vehicle or a displacement of the steering wheel.

17. A control system for a vehicle electric power steering system having a torsion bar and an electric motor, the control system comprising:
- a detection unit configured to detect a deflection or strain of the torsion bar or a torque carried by the torsion bar and provide an indication thereof;
- a controller coupled to the detection unit and configured to:
    - provide a torsion bar adjustment signal; and
    - provide a steering adjustment signal for the electric motor based at least in part on the indication; and
- a torsion bar adjuster coupled to the controller and configured to adjust a stiffness of the torsion bar in accordance with the torsion bar adjustment signal.

* * * * *